United States Patent

Woods et al.

(10) Patent No.: US 7,784,757 B2
(45) Date of Patent: Aug. 31, 2010

(54) TILTABLE WALL MOUNTS

(75) Inventors: Alan Woods, Middlesex (GB); David Lees, Bucks (GB)

(73) Assignee: Path Distribution Ltd., Oxfordshire (GB)

( * ) Notice: Subject to any disclaimer, the term of this patent is extended or adjusted under 35 U.S.C. 154(b) by 0 days.

(21) Appl. No.: 12/117,119

(22) Filed: May 8, 2008

(65) Prior Publication Data

US 2008/0308697 A1 Dec. 18, 2008

(30) Foreign Application Priority Data

May 11, 2007 (GB) .................. 0709179.6

(51) Int. Cl.
*A47F 5/08* (2006.01)

(52) U.S. Cl. ................................. 248/231.91

(58) Field of Classification Search ................ 248/917, 248/919–923
See application file for complete search history.

(56) References Cited

U.S. PATENT DOCUMENTS 6,554,242 B2 * 4/2003 Kim ........................... 248/371

FOREIGN PATENT DOCUMENTS

| GB | 581 422 | 10/1946 |
|---|---|---|
| GB | 2 311 717 A | 10/1997 |
| GB | 2 322 538 A | 9/1998 |

OTHER PUBLICATIONS

Search Report from corresponding Great Britain application Serial No. GB0709179.6, dated Jul. 9, 2007.

* cited by examiner

*Primary Examiner*—J. Allen Shriver, II
*Assistant Examiner*—Erin Smith
(74) *Attorney, Agent, or Firm*—Westman, Champlin & Kelly, P.A.

(57) ABSTRACT

The invention relates to improvements in tiltable wall mounts, and in particular to a self-locking tiltable wall mount for a screen, such as a plasma display or television screen. The tiltable wall mount for a screen comprises wall attachment means for attaching the mount to a substantially vertical surface and screen attachment means for attaching a screen to the mount. The screen attachment means are pivotally connected at one end to one end of the wall attachment means. The wall mount also has a tilt mechanism interconnecting the mount and screen attachment means, said tilt mechanism comprising a locking device comprising at least one cam follower which is biased into abutment with a stepped cam surface projecting from the wall attachment means to prevent relative movement between the wall and screen attachment means. The locking device has means to release the cam follower from the cam surface when manual pressure is applied to enable the screen mount means to pivot and tilt relative to the wall mount means.

9 Claims, 3 Drawing Sheets

TILTABLE WALL MOUNTS

The invention relates to improvements in tiltable wall mounts, and in particular to a self-locking tiltable wall mount for a screen, such as a plasma display or television screen.

Many modern display screens and televisions, as a result of the use of plasma and LCD technology, are now significantly flatter than previously. This means that there is considerably more flexibility for mounting and installing them. It is particularly advantageous that these flatter screens can be mounted on the wall, either for home or business use, as this does not use up valuable floor space. Although flat wall mounts have been the most common mounting option for such screens, tiltable wall mounts are preferable as this enables the screen to be placed higher than the desired eye level. This allows the screen to be located above shelves or a fire place and avoids the need for a ceiling mount, which have been more commonly used with commercial display screens.

One disadvantage of many existing tiltable wall mounts is that they use a frictional locking mechanism, provided by a screw or lever, which has to be manually tightened against the tilting mechanism to hold the screen at the desired tilt angle. This can be difficult to use, particularly with heavy screens, as one hand would be needed to hold the screen in place, whilst the other is needed to tighten the locking mechanism. If the screen is particularly large two people may be needed to make the adjustment.

It is therefore an object of the present invention to provide a self-locking tiltable wall mount for a screen.

The invention therefore comprises a tiltable wall mount for a screen comprising wall attachment means for attaching the mount to a substantially vertical surface, screen attachment means for attaching a screen to the mount, said screen attachment means being pivotally connected at one end to an end of the wall attachment means, and a tilt mechanism interconnecting the mount and screen attachment means, said tilt mechanism comprising a locking device comprising at least one cam follower which is biased into abutment with a stepped cam surface projecting from the wall attachment means to prevent relative movement between the wall and screen attachment means, said locking device having means to release the cam follower from the cam surface when manual pressure is applied to enable the screen mount means to pivot and tilt relative to the wall mount means.

The design is simple and keeps the components to a minimum, whilst still providing a lockable tilt movement. After adjustment the mechanism locks itself as it is necessary to support the screen and hold the locking device to operate the tilt mechanism. Releasing either causes the tilt mechanism to lock.

A preferred embodiment of the present invention will now be described, by way of example only, with reference to the accompanying drawings in which.

Figure 1:
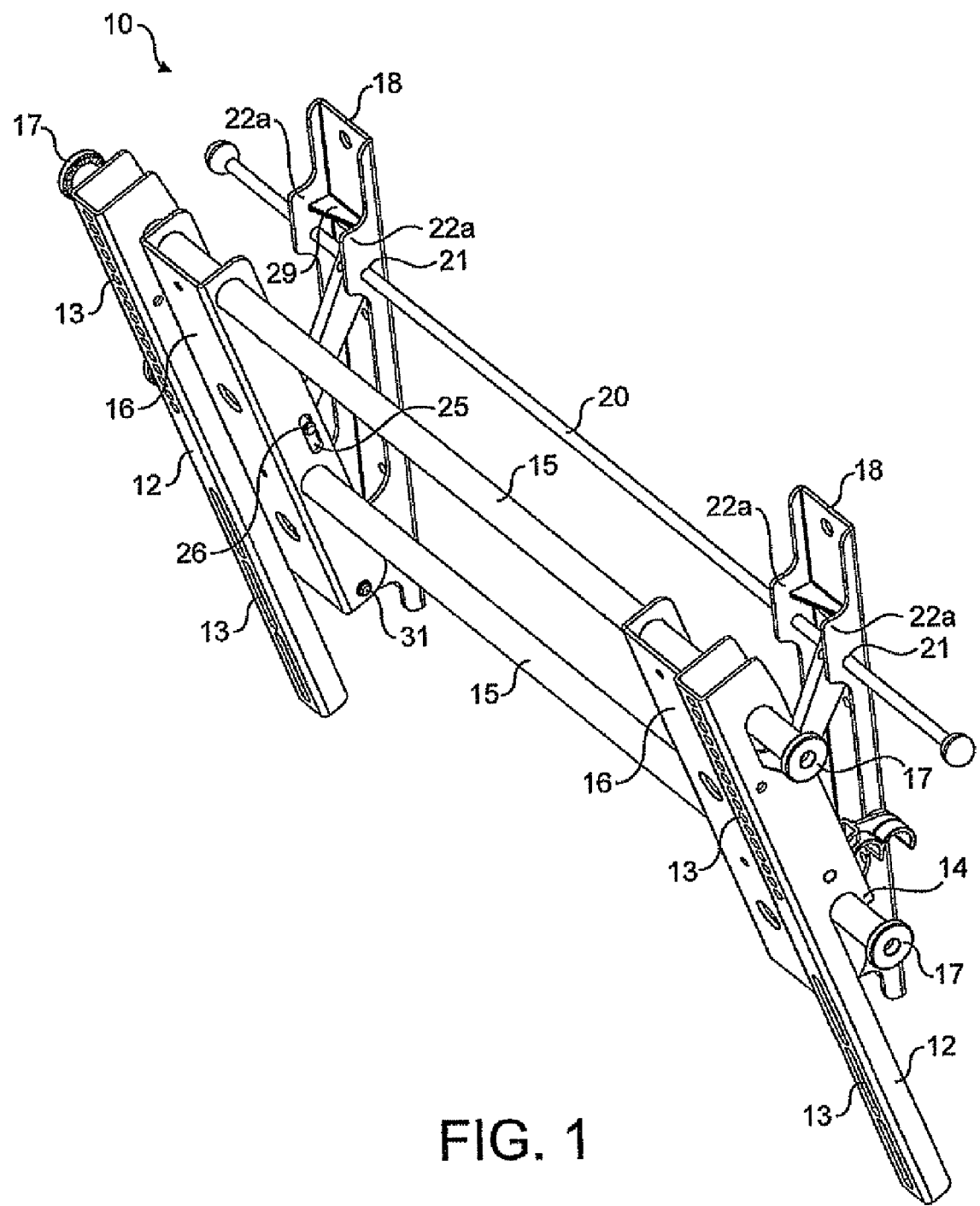
FIG. 1 is a perspective view of a tiltable wall mount according to the present invention.

Referring first to FIG. 1, a tiltable wall mount 10 according to the present invention comprises two main interconnected sections; the first section comprises means for attaching a screen 11, such as a display or television screen, to the wall mount 10; and the second section comprises means for attaching the wall mount 10 to a wall or other, preferably, vertical surface. The two sections are connected by a lockable tilt mechanism.

Figure 5:
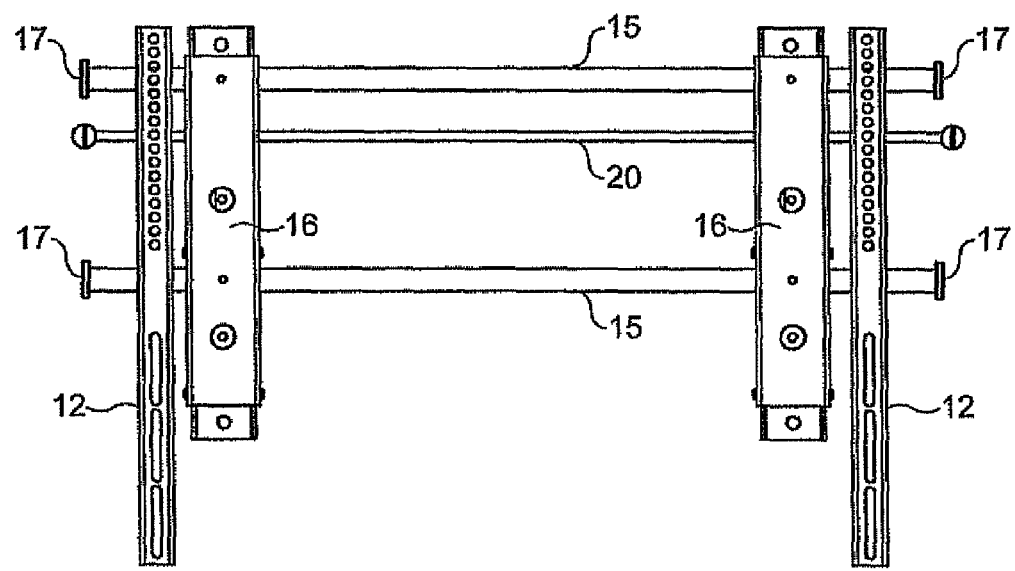
FIG. 5 is a rear elevation of the tiltable wall mount of FIG. 1.

The means for mounting the screen 11 to the wall mount 10 comprise a pair of screen brackets 12 (see FIGS. 1 and 5) which are provided with a number of apertures 13, in the form of slots and/or holes, to enable the brackets 12 to be attached to the rear of a screen 11 using suitable fixings, such as screws. The brackets 12 are also provided with a pair of hook sections 14 spaced apart along the length of the brackets 12.

The screen mounting means further comprises a support frame having a plurality of screen tubes 14, which are rigid tubular rods. Although the figures show two screen tubes 14, it is possible to use three or more, and this is desirable for larger mounts 10 for heavier and larger screens 11. The screen tubes 14 are held in a vertically spaced apart configuration by a pair of C-section tilt brackets 16. The side walls of the tilt brackets 16 each have pairs of aligned apertures through which the screen tubes 14 pass. The spacing between the upper and lower screen tubes 14 is the same as the spacing between the hook sections 14 on each screen bracket 12 to enable the screen brackets 12 to be securely hung on the screen tubes 15 by means of the hook sections 14 as shown in FIG. 1. The ends of the screen tubes 15 are provided with end stops 17, to stop the screen brackets 12 from sliding off the end of the screen tubes 15.

Figures 6, 7, 8:
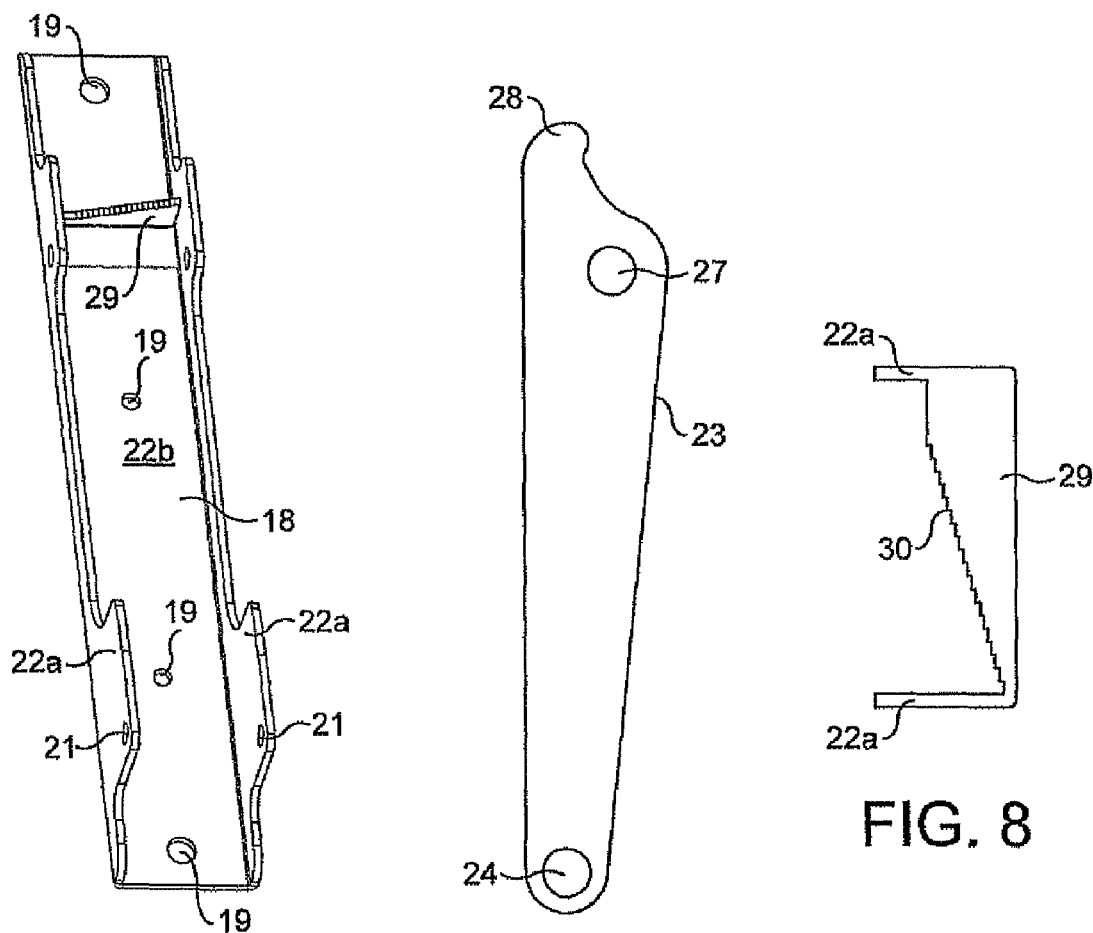
FIG. 6 is a perspective view of one of the wall brackets of the tiltable wall mount of FIG. 1.
FIG. 7 is a side elevation of one of the tilt arms of the tiltable wall mount of FIG. 1.
FIG. 8 is a plan view of the cam surface of the wall bracket of FIG. 6.

The means for mounting the wall mount 10 to a wall, or other substantially vertical surface, comprise a pair of wall brackets 18, the main body 22b of which is provided with apertures 19 to enable the wall brackets 18 to be attached to the wall with suitable fixings, such as wall bolts (see FIGS. 6 and 7). The wall brackets 18 have flange portions 22a located at the upper ends of the wall brackets 18, which project at an angle of 90 degrees from the main body 22b of the bracket 18.

The lower ends of the wall brackets 18 and screen brackets 12 are pivotally connected by a pivot pin 31, and this provides the axis of rotation for the mount 10.

The tilt mechanism comprises a locking device in the form of a tilt adjustment bar 20 which passes through holes 21 in the wall bracket flange portions 22a.

The tilt mechanism further comprises a pair of tilt arms 23, one of which is shown in FIG. 7, which are connected at opposite ends to the screen mounting means and the wall mounting means respectively. Through the lower ends of the tilt arms 23 is a first aperture 24 and a sliding pin 26 is inserted through slots 26 in the side walls of the tilt brackets 16 and the first aperture 24 to retain the end of the tilt arms 23 between the tilt bracket side walls.

A second aperture 27 is provided in the upper ends of the tilt arms 23, which provide the means for connection to the wall brackets 18. A tilt adjustment bar 20 passes through holes in the wall bracket flange portions 22a and the second aperture 27 to restrain the upper end of each tilt arm 23 between the flange portions 22a of each wall bracket 18. Each tilt arm 23 is attached to the tilt adjustment bar 20 by means of a fixing such as a grub screw, to prevent relative rotation between the tilt arms 23 and adjustment bar 20.

The upper end of each tilt arm 23 is provided with a narrow section which forms a cam follower 28, which is part of the locking mechanism. Located between the flange portions 22a and projecting from the main body 22b of each of the wall brackets 18 is a wedged shaped horizontally projecting flange 29. The flange 29 has a stepped cam surface 30, and when the mount 10 is assembled, the cam followers 28 of the tilt arms 23 are forced into abutment against the cam surface 30 to prevent movement of the tilt mechanism.

In use, the screen brackets 12 are attached to the rear of a screen 11 and the wall brackets 18 are attached to a wall with suitable fixings. The screen 11 is hung on the mount 10 by placing the hook sections 14 of the screen brackets 12 over the upper and lower screen tubes 15. To adjust the position of the screen 11, the weight of the screen 11 is taken with one hand and the tilt adjustment bar 20 is pushed or pulled (depending on which end of the bar 20 the person making the adjustment is holding) in a horizontal direction so that it slides through the holes 21. This releases the cam follower 28 from the cam surface 30, which unlocks the tilt mechanism. The screen 11 can then be tilted as the adjusted bar 20 is now rotatable relative to the wall brackets 18, which allows the tilt and wall the upper end of the tilt arms 23 to rotate with the adjustment bar 20. The lower ends of the tilt arms 23 allow brackets 16 and 18 to pivot relative to each other about the pivot pin 31, as the lower ends of the tilt arms 23 move longitudinally along and pivot within the slots 25 in the tilt brackets 16.

Figure 4:
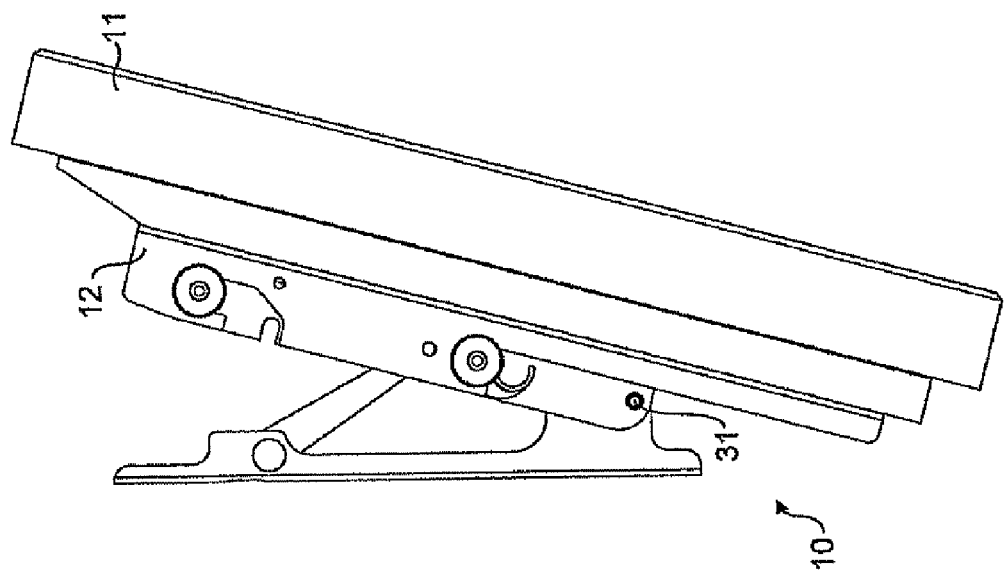
FIG. 4 is the same end elevation of the screen and tiltable wall mount of FIG. 2, with the screen tilted in a downwards direction.
Figure 3:
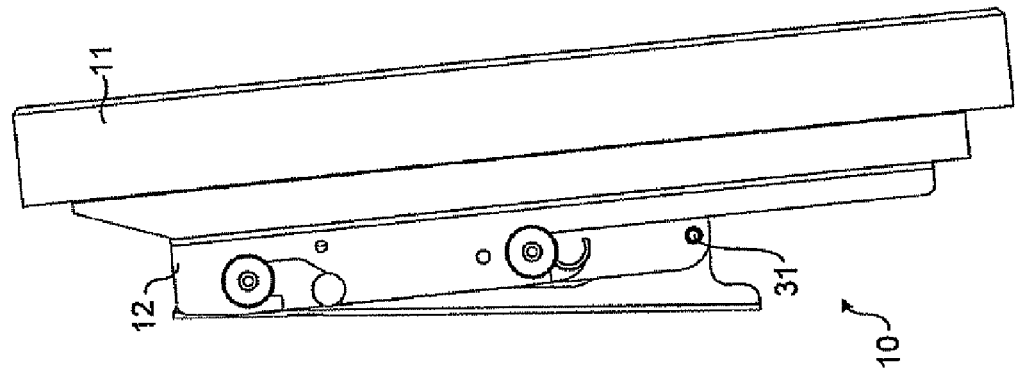
FIG. 3 is the same end elevation of the screen and tiltable wall mount of FIG. 2, with the screen tilted in an upwards direction.
Figure 2:
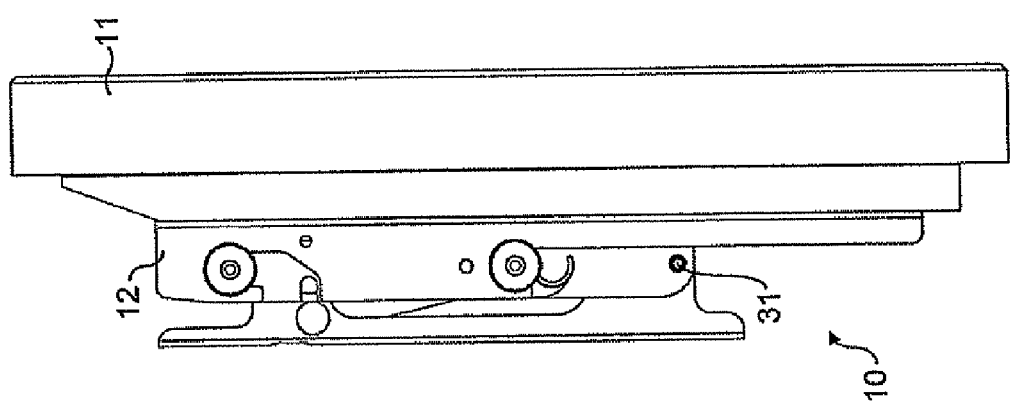
FIG. 2 is an end elevation of a screen attached to the tiltable wall mount of FIG. 1.

FIG. 2 shows the screen 11 in a vertically mounted position, and FIGS. 3 and 4 show the screen 11 tilted in an upwards and downwards direction respectively. Releasing the tilt adjustment bar 20 will cause the cam follower 28 to move back into contact with the cam surface 30 to thereby lock the mechanism and prevent any further relative movement of the bar 20, and therefore the screen 11.

The mount 10 is preferably made from mild steel or another suitable material, and this is generally determined by the intended size and weight of the screen which is to be supported by the mount 10.

Although the embodiment of the invention illustrated has a pair of wall, tilt and screen brackets, the number may vary.

The invention claimed is:

1. A tiltable wall mount for a screen comprising wall attachment means for attaching the mount to a substantially vertical surface, screen attachment means for attaching a screen to the mount, said screen attachment means being pivotally connected at one end to one end of the wall attachment means, and a tilt mechanism interconnecting the mount and screen attachment means, said tilt mechanism comprising a locking device comprising at least one cam follower which is biased into abutment with a stepped cam surface projecting from the wall attachment means to prevent relative movement between the wall attachment means and the screen attachment means, said locking device further comprising an adjustment bar with a longitudinal axis, wherein manual pressure resulting in movement of the adjustment bar in a direction along the longitudinal axis releases the cam follower from the cam surface to enable the screen mount means to pivot and tilt relative to the wall mount means.

2. A tiltable wall mount as claimed in claim 1 in which the wall attachment means comprise at least one wall bracket and means for affixing the at least one wall bracket to a substantially vertical surface.

3. A tiltable wall mount as claimed in claim 1 in which the cam surface comprises a wedge shaped flange projecting horizontally from the wall bracket.

4. A tiltable wall mount as claimed in claim 1 in which the screen attachment means comprise at least one screen bracket having means for attachment to a rear surface of a screen and a support frame, the at least one screen bracket having means for removably attaching it to the support frame.

5. A tiltable wall mount as claimed in claim 4 in which the support frame comprises a plurality of rods held in a substantially vertically spaced apart configuration by a plurality of tilt brackets.

6. A tiltable wall mount as claimed in claim 1 in which the tilt mechanism further comprises at least one tilt arm connected pivotally at one end to the at least one tilt bracket and at the other end to the at least one wall bracket.

7. A tiltable wall mount as claimed in claim 6 in which the adjustment bar connects the at least one tilt arm to the at least one wall bracket, wherein manual pressure resulting in horizontal axial movement of adjustment bar releases the cam follower from the cam surface to unlock the locking device.

8. A tiltable wall mount as claimed in claim 6 in which an end of the tilt arm is formed to provide said cam follower.

9. A tiltable wall mount as claimed in claim 6 in which the lower end of the at least one tilt arm is pivotally attached to the at least one tilt bracket by means of a pin which is slidable in an elongate longitudinal slot in the at least one tilt bracket.

* * * * *

UNITED STATES PATENT AND TRADEMARK OFFICE
CERTIFICATE OF CORRECTION

PATENT NO. : 7,784,757 B2 Page 1 of 1
APPLICATION NO. : 12/117119
DATED : August 31, 2010
INVENTOR(S) : Alan Woods and David Lees It is certified that error appears in the above-identified patent and that said Letters Patent is hereby corrected as shown below:

Title Page, Item (73) Assignee:

Change "Path Distribution Ltd., Oxfordshire (GB)" to --IXOS Holdings Ltd., Oxfordshire (GB)--

Signed and Sealed this

Twenty-third Day of November, 2010

David J. Kappos
*Director of the United States Patent and Trademark Office*